US00RE35160E

United States Patent [19]

Nichols

[11] E Patent Number: Re. 35,160

[45] Reissued Date of Patent: Feb. 27, 1996

[54] FISHING LURE AND METHOD OF MANUFACTURE

[76] Inventor: David Nichols, 8415 Lavenham, San Antonio, Tex. 78250

[21] Appl. No.: 303,708

[22] Filed: Sep. 9, 1994

Related U.S. Patent Documents

Reissue of:

[64] Patent No.: 5,146,707
Issued: Sep. 15, 1992
Appl. No.: 718,251
Filed: Jun. 20, 1991

[51] Int. Cl.[6] ..... A01K 85/00

[52] U.S. Cl. ..... 43/42.53; 43/42.33

[58] Field of Search ..... 43/42.53, 42.32, 43/42.33, 42.13, 42.34, 17.6, 17.5; 427/346, 386

[56] References Cited

U.S. PATENT DOCUMENTS

| | | | |
|---|---|---|---|
| 468,361 | 2/1892 | Pflueger | 43/42.34 |
| 2,202,519 | 5/1940 | Ferris | 43/17.6 |
| 2,547,240 | 4/1951 | Young et al. | 43/42.34 |
| 2,664,364 | 12/1953 | Thom | 427/346 |
| 3,367,060 | 2/1968 | Abercrombie | 43/42.33 |
| 3,954,762 | 5/1976 | Helm | 528/94 |
| 4,259,377 | 3/1981 | Baize | 427/346 |
| 4,625,448 | 12/1986 | Borders | 43/42.19 |
| 4,663,190 | 5/1987 | Fujita et al. | 427/386 |
| 4,775,735 | 10/1988 | Goel | 528/90 |
| 4,862,631 | 9/1989 | Wilson et al. | 43/42.33 |
| 4,912,871 | 4/1990 | Brady | 43/42.32 |

*Primary Examiner*—P. Austin Bradley
*Assistant Examiner*—Chuck Y. Mah
*Attorney, Agent, or Firm*—Gunn, Lee & Miller

[57] ABSTRACT

A fishing lure having the property of dispersing substantially all incident light in multi-directions results from the application of a glitter containing coating to the external surfaces of the lure body. Ultra-fine glitter particles are employed which are inserted in a highly viscous stage of a liquid mixture of a resin and a hardener and are maintained in a uniform dispersion throughout the entire body of the coating by rotation of the lure body during the completion of the hardening of the resin coating.

9 Claims, 2 Drawing Sheets

FISHING LURE AND METHOD OF MANUFACTURE

Matter enclosed in heavy brackets [ ] appears in the original patent but forms no part of this reissue specification; matter printed in italics indicates the additions made by reissue.

BACKGROUND OF THE INVENTION

1. Field of the Invention:

This invention relates to a fishing lure and method of manufacturing same, and particularly to a fishing lure having a unique multi-faceted, light dispersing coating applied to its external surfaces to aid in attracting fish to the lure.

2. Summary of the Prior Art:

The number of fishing lures that have been heretofore developed are almost as numerous as the number of people enjoying sport fishing. Lures of many different configurations have been developed and such lures are provided in a rainbow variety of colors, all with the hope that a particular color will be most attractive to the fish under the light conditions existing at the time.

Most fishing lures incorporate a hook, or a plurality of hooks, which are either integral with a leader connecting shank portion or are mechanically connected to a leader connecting shank portion. A body of any desired configuration may be formed in surrounding relationship to the shank portion by surrounding the shank portion with a mold, and pouring molten lead or other suitable low melting temperature material into the mold cavity. The lure body or head thus formed may be utilized to surround and secure the mechanical connection between the shank portion of the lure and the hook portions.

In a common form of lure, the head is of circular cross section, with the medial portion of larger diameter than either the front or rear portions which are tapered to smaller diameters. A plurality of plastic streamers are often clamped in surrounding relationship to the body, and, in particular, extend rearwardly from the body to conceal the hook.

To change the color of the lead casting from its normal dull silver tone, it has been common practice to apply a coating of a liquid resin which is then permitted to dry and harden on the body. Such resins are available in a plurality of colors. More recently, metallic glitter particles of fairly substantial size have been applied to the surface of the body of a fishing lure to produce a dispersed reflection of light striking the lure body. Such glitter particles have heretofore been applied by coating the body with a thin layer of a glue or semi-hardened resin and then dusting the glitter particles onto the coating while it is still wet, or utilizing an aerosol spray to apply the glitter particles. The same technique has been used to apply glitter particles to the surfaces of spoon type lures.

The problem arising with the metallic glitter particles thus applied to fishing lures is that they are all disposed on the surface of the lure and any scratch on the lure will remove a substantial number of particles. Moreover, since they lie on the surface, a great majority of the particles are disposed with their flat surfaces facing outwardly. Thus, the light dispersion produced is primarily in the form of outwardly directed rays emenating from the flat surfaces of the glitter particles. The number of glitter particles, and the spacing thereof on the lure was entirely haphazard, depending upon the skill of the person doing the dusting or spraying operation. Thus, the lures did not provide a uniform appearance and, moreover, light striking the body of the lure intermediate the glitter particles was not satisfactorily dispersed or reflected.

SUMMARY OF THE INVENTION

It is an object of this invention to provide a practical method of dispersing small glitter particles throughout a coating applied to the body of the lure in order to produce a light reflecting and dispersing coating which will reflect substantially all of the light incident on the body of the lure in a very large plurality of directions. In effect, the body of the lure, as viewed by a fish, has literally hundreds of light rays emenating from it in many directions. As viewed by the human eye, the resulting lure appears to take on a very enhanced three dimensional effect and it is believed that this enhanced three dimensional property imparted to the lure by the method of manufacture embodying this invention results in a significant increase in the attractiveness of the lure to fish, as has been born out in actual usage of the lure.

The term "body" of the lure as used hereinafter refers either to the tear drop shaped body applied to a lure having a leader connected to the shank portion projecting out of one end of the body and a hook or hooks projecting out of the other end of the body, or to any form of blade, spoon or other vibrating element swivelly attached to the lure to further attract the attention of the fish. Thus, the term body includes, without limitation, spinner baits, popping lures, jig-type lures, "buzz baits", crank baits, blades and spoons of any size or shape.

In accordance with this invention, a transparent 1 resin coating applied to all external surfaces of the body of the lure is produced by mixing a liquid resin with a hardener. The mixing of these two ingredients results in. a chemical reaction which produces a significant amount of heat and gradually over a period of 30 to 180 minutes, depending on ambient humidity produces a hardened transparent resin product. The liquid mixture passes from a pure liquid stage through a highly viscous stage and then becomes a transparent solid.

In accordance with this invention, metallic or plastic glitter particles of any selected color are mixed in the liquid mixture when it is in the highly viscous stage and stirred so as to disperse the glitter particles throughout the entire body of the highly viscous liquid mixture. The glitter particles employed are, in the majority, of very small dimensions, prefer ably not exceeding 0.01 [mms] *inches* in any dimension.

Due to the highly viscous state of the mixture of resin and hardener at the time that the glitter particles are added, the glitter particles are dispersed throughout the body of the liquid mixture while the mixture is stirred. When the highly viscous glitter containing liquid is applied to the body of the lure, as by brushing or dipping, a relatively thick coating results, with glitter particles disposed uniformly throughout the thickness of the coating and positioned with their flat sides in literally hundreds of different planes.

The applied glitter coating must undergo a further period of drying or completing the hardening reaction before it becomes solid. During this period, it is very important that glitter particles, which may be heavier than the viscous liquid mixture of resin and hardener, from migrating under the force of gravity before the coating becomes completely hard. This invention contemplates mounting the lure bodies with the applied glitter coating on a rotating support and continuously slowly rotating the support around a horizontal axis during the completion of the resin hardening phase of the process.

The resulting lure body has literally hundreds of glitter particles disposed uniformly throughout the coating and at as many different angles relative to incident light as there are particles. Light that is incident upon the glitter containing coating is reflected and dispersed in literally hundreds of different directions, thus giving the aforementioned enhanced three dimensional appearance to the human eye and substantially increasing the attractiveness of the lure to fish as proven by actual performance of the lure.

Further objects and advantages of the invention will be readily apparent to those skilled in the art from the following detailed description, taken in conjunction with the annexed sheets of drawings, on which is shown a preferred embodiment of the invention.

DESCRIPTION OF PREFERRED EMBODIMENT

Figure 1:
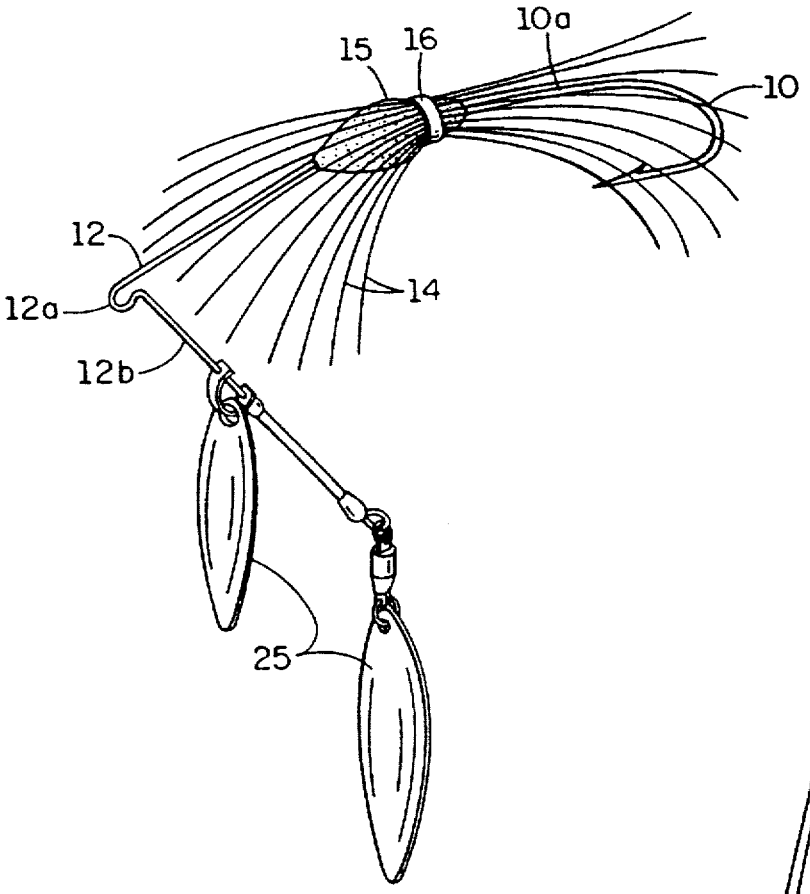
FIG. 1 is a perspective view of a commonly known form of bait casting lure incorporating both a tear drop shaped body secured to a shank portion or leader connecting portion of a hook together with a pair of blades swivelly mounted on a downwardly inclined extension of the leader connecting shank portion.

As previously mentioned, a glitter containing transparent coating embodying this invention may be applied to any type of fishing lure. Thus, the conventional spinner bait lure shown in FIG. 1 incorporates a hook 10 having a shank portion 10a, the end of which is mechanically connected to the end of a leader connecting wire 12 by having the interconnected ends encased in a cast lead body element 15 to which a glitter containing coating embodying this invention is applied. A skirt comprising a plurality of plastic streamers 14 may then be secured in surrounding relationship to the body 15 by a rubber band or metallic clip 16.

The leader connecting wire 12 is bent to form a leader connecting loop 12a in its medial portion and has a blade mounting portion 12b extending downwardly and rearwardly from the leader connecting loop 12a. One or more blades 25 are conventionally swivelly mounted on the downwardly inclined portion 12b of the leader connecting wire 12 and are also provided with a glitter containing coating in accordance with this invention. All such coatings are indicated by the ink dots.

Figure 2:
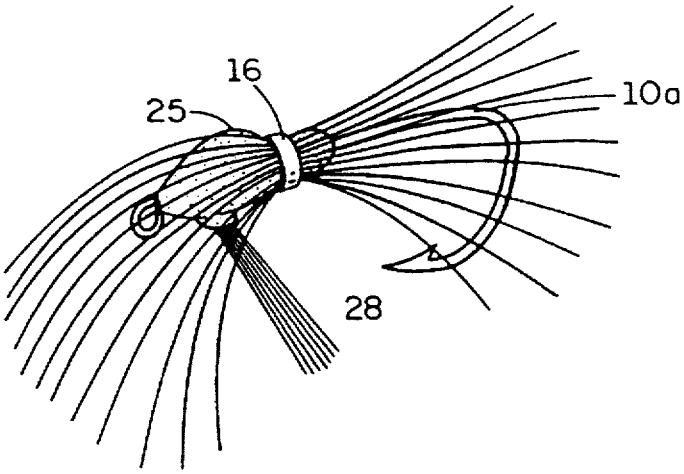
FIG. 2 is a perspective view of a jig type lure incorporating only a tear drop shaped body element mounted on the shank portion of a hook.

Similarly, FIG. 2 shows a conventional jig type lure having a tear drop shaped body portion 25 mounted directly on the shank portion 10a of a hook 10 and a skirt of plastic streamers 14 secured to the body 25 by a rubber or metallic clip 16. Additionally, plastic streamers 28 may be secured in depending relationship to the body 15. A glitter containing, transparent plastic coating embodying this invention is applied to all surfaces of lure body 25.

Regardless of the type of lure, the main body element thereof is covered with a glitter containing, transparent plastic coating in accordance with the method of this invention.

To produce such coating, a liquid epoxy resin and a hardener for such resin are mixed to produce a chemical reaction resulting in converting the liquid mixture into a solid by passing through a highly viscous liquid stage.

Preferably, the liquid resin may be a modified Diglycidyl Ether of Bisphenol A sold by the Flex Coat Company, Inc. of Driftwood, Tex. under the trademark "FLEX COAT ROD WRAP FINISH". A preferred liquid hardener comprises an Aliphatic Ether Amine Nonononylphenol which is also sold by the aforesaid Flex Coat Company. Equal quantities by volume of the liquid resin and liquid hardener are mixed.

When the mixture of liquid resin and hardener reaches a highly viscous stage, a large quantity of very small glitter particles are added to the liquid mixture and stirred so as to obtain a uniform dispersion of the glitter particles in the hardening liquid mixture.

Preferably ultra fine metallic glitter particles sold by Gick Publishing, Inc. of Irvine Calif. under the trademark "Ultra-Fine Prisma" are employed. These metallic glitter particles are hexagonal in shape and have no dimension in excess of 0.01 [mms] *inches*. The metallic glitter particles are formed with flat Chips of glitter. It has been found that if the metallic glitter particles are larger than 0.01 [mms] *inches*, upon rotating the lure body as described hereinbelow, the glitter migrates to one end of the lure body. If the glitter particles are too small, they will not give the reflective quality desired and, hence, will not appear as live bait. Alternatively, colored particles of polyester or other plastic compatible with the transparent resin may be utilized. The volume of such glitter particles is preferably from ⅙ to ½ the volume of the highly viscous liquid mixture. A modest quantity of some slightly larger glitter particles may also be introduced into the liquid mixture, but it is important that the majority of the particles, whether metallic or plastic, be the very small glitter particles having no dimension in excess of 0.01 [mms] *inches*.

Figure 3:
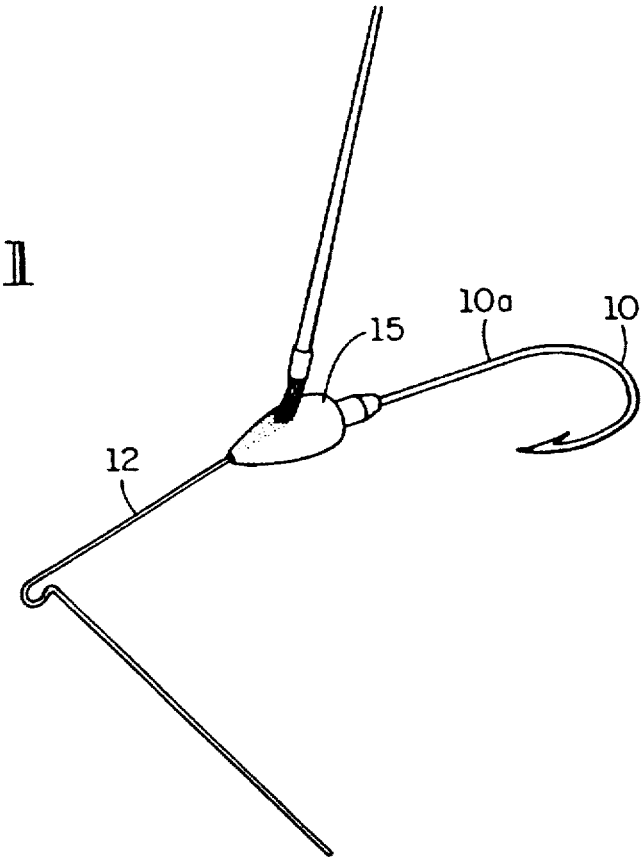
FIG. 3 is a schematic representation of the application of a glitter coating to the body of the lure of FIG. 1.

The highly viscous, glitter containing liquid mixture is then applied to the lure body by brushing (FIG. 3) or by dipping. The thickness of the resulting coating should be at least 0.03 [mms] *inches* or three times the maximum size of the small glitter particles. By the thickness of the coating being three times the maximum size of the glitter particles, the glitter particles can be oriented in all directions within the coating. Since the glitter particles are literally flat flakes, if the thickness is not approximately three times the size of the glitter particles, the glitter particles will tend to lay flat. If the glitter particles lay flat, then the reflective effect would be two dimensional rather than three dimensional and, again, it would not give the appearance of live bait. The coated lure bodies are then permitted to dry or complete the hardening of the liquid resin mixture while being rotated in a vertical plane.

Figure 5:
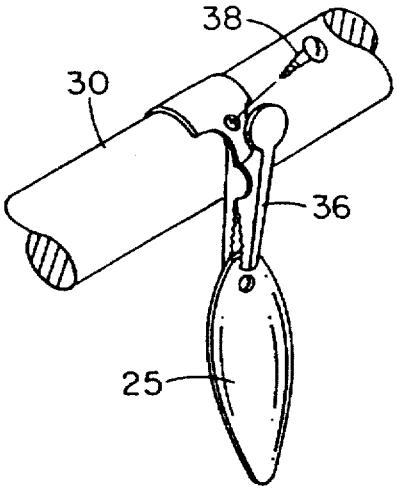
FIG. 5 is an enlarged scale, perspective view of a dryer rack mounting element for blade or spoon type lure bodies.
Figure 4:
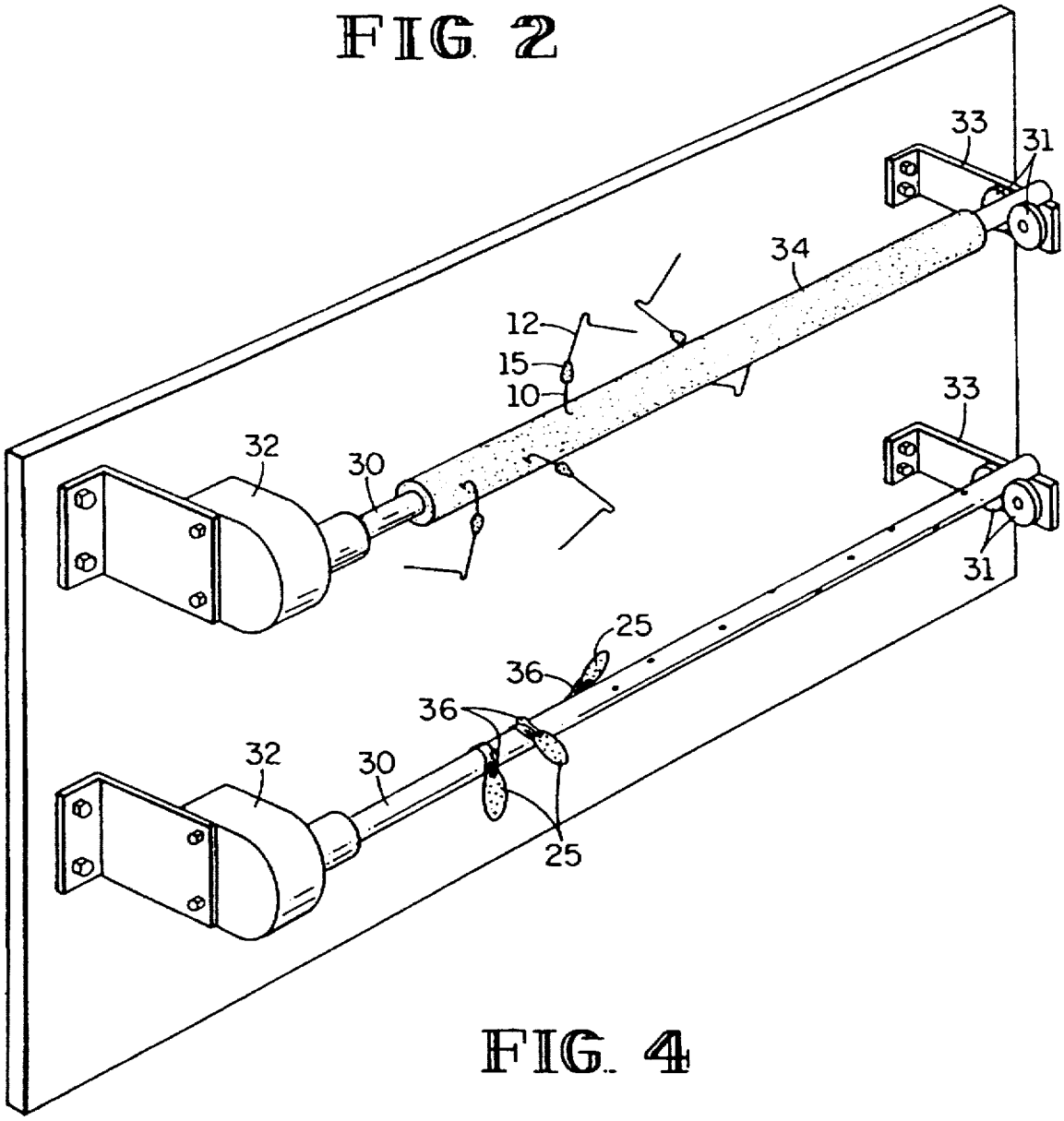
FIG. 4 is a perspective view of a motorized rack for effecting rotation of coated lure bodies during completion of the resin hardening process.

Referring to FIG. 4, a plurality of rotating shafts 30 are driven by respective electric motor driven gear reduction units 32 and rotate slowly about a horizontal axis. Speed of 5 to 10 rpm are satisfactory. The outer end of each shaft 30 is supported by a pair of rotatable discs 31 which are horizontally journalled on a bracket 33. A relatively soft rubber or rubber like plastic tube 34 is mounted in surrounding relationship to at least one shaft 30. The tube 34 permits lure bodies which are attached to hooks to be conveniently suspended by inserting the hook portion into the soft rubber like material. In the case of lure bodies comprising blades, an alligator clip 36 (FIG. 5) engages the mounting hole normally provided in the blade lure and is threadably mounted on shaft 30 by screws 38 (FIG. 5). The purpose of the alligator clip is to prevent the coated lure body from contacting the surface of the shaft 30.

The lure bodies coated with the glitter containing coating embodying this invention are rotated until the chemical reaction between the resin and hardener is completed and the coating has become a solid. Thus, the glitter particles are fixed in their dispersed positions within the coating and, since the coating is transparent, any light penetrating the surface of the coating between glitter particles will impinge upon other interiorly located glitter particles and be reflected and dispersed, as will substantially all incident light falling on the coated lure body.

Modifications of this invention will be readily apparent to those skilled in the art and it is intended that all such modifications be defined by the following claims.

What is claimed and desired to be secured by Letters Patent is:

1. A light dispersing and reflecting fishing lure comprising a body securable to a fishing line;

said body having a solid, light dispersing, transparent resin coating over the entire outer surface of said body;

said transparent resin coating containing a large plurality of pieces of brightly colored, light reflecting glitter particles of a size not exceedingly 0.01 [mms] *inches* in any direction; and said glitter particles being substantially uniformly dispersed throughout said coating, whereby substantially all light incident on said body is reflected and dispersed in all directions from said transparent resin coating.

2. The fishing lure of claim 1 wherein said transparent coating has a thickness of at least three times the maximum dimension of said glitter particles.

3. A light dispersing and reflecting fishing lure comprising a body securable to a fishing line;

said body having a solid, light dispersing transparent resin coating over the entire outer surface of said body;

said resin coating being formed by mixing a liquid resin and a hardener capable of converting said resin from a liquid to a transparent solid state by passing through a high viscosity liquid state;

a large plurality of pieces of brightly colored, light reflecting glitter particles of a size not greater than 0.01 [mms] *inches* in any dimension;

said glitter particles being introduced into, and dispersed throughout the mixture of said liquid resin and hardener when said high viscosity state is achieved; and said high viscosity liquid mixture containing said glitter particles being applied to the entire surface of said body and hardened to a solid state while said body is rotated in a vertical plane, thereby producing a uniform distribution of said glitter particles throughout said solid, transparent resin coating.

4. The fishing lure of claim 3 wherein said transparent coating has a thickness of at least three times the maximum dimension of said glitter particles.

5. A fishing lure comprising:

a hook assembly having a linear shank portion and a curved end hook portion;

a lead head surrounding and adhered to said linear shank portion;

a solid light dispersing transparent resin coating over the entire outer surface of said head;

said resin coating being formed by mixing a liquid resin and a liquid hardener capable of convening said resin from a liquid to a transparent solid state by passing through a high viscosity liquid state; and a large plurality of pieces of brightly colored, light reflecting metallic glitter particles of a size not greater than 0.01 [mms] *inches* in any dimension;

said glitter particles being introduced into, and dispersed throughout the mixture of said liquid resin and liquid hardener when said high viscosity state is achieved;

said high viscosity liquid mixture containing said glitter particles being applied to the entire surface of said head and hardened to a solid state while said head is rotated in a vertical plane, thereby maintaining a uniform distribution of said glitter particles throughout said solid, transparent resin coating, whereby substantially all incident light on said transparent resin coating is reflected and dispersed from said transparent resin coating.

6. The fishing lure of claim 5 further comprising a metallic blade having a selected color coating matching color of said lead head;

7. The method of producing a solid, light dispersing coating on all surfaces of a fishing lure element comprising the steps of:

(1) forming a transparent coating by mixing a liquid resin and a hardener capable of converting said liquid resin from a liquid to a transparent solid state by passing through a high viscosity liquid state;

(2) providing a large plurality of pieces of brightly colored, light reflecting, glitter particles;

(3) dispersing said glitter particles throughout the mixture of said liquid resin and hardener when said high viscosity state is achieved;

(4) said high viscosity liquid mixture containing said glitter particles being applied to the entire surface of said fishing lure element; and (5) completing hardening of the applied high viscosity liquid mixture by rotating the lure element in a vertical plane to achieve a uniform solid, transparent coating with said glitter particles uniformly dispersed throughout the solid coating.

8. The method of claim 7 wherein said liquid resin comprises a Diglycidyl Ether of Bisphenol A, and said hardener comprises an Aliphatic Ether Amine Nonononylphenol.

*9. A fishing lure element produced by the method of claim 7.*

* * * * *